(12) United States Patent
Parr et al.

(10) Patent No.: US 8,866,469 B2
(45) Date of Patent: Oct. 21, 2014

(54) ELECTRIC FIELD MONITORING SYSTEM AND METHOD

(75) Inventors: Robert Parr, Toronto (CA); Leo Van Kampen, Toronto (CA); William Dimopoulos, Toronto (CA); Sanjay Sood, Toronto (CA)

(73) Assignee: Altas Polar Company Limited, Toronto, Ontario ( * ) Notice: Subject to any disclaimer, the term of this patent is extended or adjusted under 35 U.S.C. 154(b) by 244 days.

(21) Appl. No.: 13/417,607

(22) Filed: Mar. 12, 2012

(65) Prior Publication Data
US 2013/0033258 A1  Feb. 7, 2013

Related U.S. Application Data

(60) Provisional application No. 61/452,094, filed on Mar. 12, 2011.

(51) Int. Cl.
*G01B 7/14* (2006.01)

(52) U.S. Cl.
CPC ........................... *G01B 7/14* (2013.01)
USPC .................. 324/207.22; 324/207.11

(58) Field of Classification Search
None
See application file for complete search history.

(56) References Cited

U.S. PATENT DOCUMENTS

| | | | |
|---|---|---|---|
| 3,125,751 A | 3/1964 | Winters | |
| 4,598,363 A | 7/1986 | Clark et al. | |
| 4,649,375 A | 3/1987 | Duppong et al. | |
| 4,904,996 A * | 2/1990 | Fernandes | 340/870.07 |
| 5,001,465 A | 3/1991 | Siegel | |
| 5,502,374 A * | 3/1996 | Cota | 324/127 |
| 6,124,798 A | 9/2000 | Tai et al. | |
| 6,600,426 B1 | 7/2003 | Sacks et al. | |
| 6,853,307 B2 | 2/2005 | Nickerson | |
| 7,543,780 B1 * | 6/2009 | Marshall et al. | 244/194 |
| 7,764,169 B2 * | 7/2010 | Rowell et al. | 340/508 |
| 2001/0040446 A1 * | 11/2001 | Lapinksi et al. | 324/126 |
| 2007/0018841 A1 * | 1/2007 | Nickerson | 340/685 |
| 2011/0153169 A1 * | 6/2011 | Peterson | 701/50 |

FOREIGN PATENT DOCUMENTS

WO   2008102225 A2   8/2008

OTHER PUBLICATIONS

Arcolano, N. et al., "Power Line Proximity", Worcester Polytechnic Institute, Apr. 27, 2001.
SIGALARM, "Installation Manual & Operating Instructions Model 410", copyright 2010, http://www.sigalarminc.com/documents/410%20installation_2010%20final.pdf.
Zeng, S. et al., "Effectiveness of a worker-worn electri-field sensor to detect power-line proximity and electrical-contact", Journal of Safety Research, Jun. 2010, pp. 229-239, vol. 41, Issue 3.

\* cited by examiner

*Primary Examiner* — Vinh Nguyen
(74) *Attorney, Agent, or Firm* — Bereskin & Parr LLP/S.E.N.C.R.L., s.r.l.

(57) ABSTRACT

Several systems and methods for monitoring the proximity of a device to a power line are disclosed. Electric field monitoring systems are mounted to the device and include a plurality of electric field sensors and a monitoring system base unit. Each electric field monitoring sensor senses the strength of a magnetic field in which the sensor is positioned and transmits a corresponding magnitude output signal to the base unit when polled by the base unit. If a sensor reports a magnetic field exceeding a threshold, the frequency of polling for that sensor may be increased. If a sensor reports a magnetic field exceeding another (possibly identical) threshold, an alarm may be activated, movement of the device may be limited or stopped or another action or a combination of actions may be taken.

21 Claims, 5 Drawing Sheets

ELECTRIC FIELD MONITORING SYSTEM AND METHOD

CROSS-REFERENCE TO PRIOR APPLICATIONS

This application claims the benefit of U.S. patent application No. 61/452,094, filed Mar. 12, 2011, which is herein incorporated by reference.

FIELD

The described embodiments relate to a method and apparatus for monitoring the proximity of the equipment to electric field generating source.

BACKGROUND

U.S. Pat. No. 3,125,751 (Winters) discloses alarms for indicating to operating personnel when a projecting portion of a vehicle or other apparatus too closely approaches an energized electric power line.

U.S. Pat. No. 6,600,426 (Sacks et al.) discloses an alarm system for detecting an warning of the risk of shock and electrocution. The alarm system is adapted for use with mobile construction equipment, e.g., cranes, trucks, etc., that can be used around overhead power transmission lines. The alarm system has a sensor that detects the presence of outside power at the equipment where current is flowing therethrough to the ground. The sensor preferably includes a conductor and an inductive sensor such as a current transformer which limits the output signal on its low side that is sent to an alarm unit. In this manner, the system purports to continue to properly function despite the presence of large voltages at the equipment such as when the equipment contacts a high voltage power transmission line. The sensor can include a cable that provides a path of least resistance for current flowing through the equipment which can be detected by the sensor. Preferably, the cable is attached across a moving joint of the equipment where potential differences readily can be found. Alternatively, the conductor can be a portion of the equipment itself, through which current flows with the sensor detecting the flow through the equipment portion.

U.S. Pat. No. 6,853,307 (Nickerson) discloses a high-voltage-proximity warning system that has a local panel for being positioned in or about a cab of heavy equipment or other vehicle, a remote panel in predetermined electrical communication with the local panel and one or more proximity antennas for being positioned selectively on the vehicle in predetermined electrical communication with the local panel. The local panel is adapted to be push-button operable conveniently by an operator with gloved hands in a position where it is readily visible and easily connectable electrically to the remote panel and to the one or more proximity antennas. The remote panel is adapted to be positioned on or off of the vehicle where it can be protected for supportive operation and accessed for plural electrical connection to electrical devices that can include an electrical-source terminal, to speakers, and to warning and alarm communication devices. A method for use includes placing the local panel suitably for access by the vehicle operator in or about the cab, placing the remote panel suitable for access by a user technician in the vicinity of the local panel, setting control levels of high-voltage sensing an alarm control by the user technician, adjusting the alarm setpoint by the operator within the control levels set by the user technician in a configuration mode and connecting the system to an ignition terminal and to the communication devices which can be customized for use conditions.

SUMMARY

In a first aspect, some embodiments of the invention provide a power line proximity monitoring system comprising: a plurality of sensors mountable on a piece of equipment, each sensor comprising a sensing apparatus, a sensor controller and a wireless sensor transceiver, wherein the sensing apparatus is operable to sense a magnitude of an electric field, the controller is linked to the sensing apparatus and is operable to generate a sensor magnitude output signal corresponding to the sensed magnitude, and the sensor transceiver is linked to the sensor controller and is operable to transmit the sensor magnitude output signal; a base station comprising a base controller and a wireless base transceiver, wherein the base transceiver is configured to wirelessly communicate with each of the plurality of sensor transceivers, and the base controller is linked to the base transceiver to receive the plurality of sensor magnitude output signals; and an analysis module to compare the plurality of sensor magnitude output signals to a pre-determined threshold magnitude and to output a command signal when the magnitude of at least one sensor magnitude output signal exceeds the threshold magnitude.

In some embodiments, each sensor transceiver is in two-way communication with the base transceiver.

In some embodiments, the base transceiver is operable to wirelessly transmit a sensor control signal to each sensor to remotely control an operational parameter of each sensor.

In some embodiments, remotely controlling the operation parameter comprises adjusting an electric field sensing resolution of the sensing apparatus.

In some embodiments, the base controller is operable to selectably trigger the base transceiver to poll the plurality of sensors to obtain the sensor magnitude output signals.

In some embodiments, the base controller is operable to serially poll the plurality of sensors in a first order.

In some embodiments, when at least one sensor outputs a sensor magnitude output signal that exceeds the threshold magnitude the command signal comprises a poll re-order signal and the base controller is operable to poll the plurality of sensors in a different, second order based on the poll re-order signal.

In some embodiments, the poll re-order signal configures the base controller to poll the at least one sensor more frequently than the other sensors in the plurality of sensors.

In some embodiments, the poll re-order signal configures the base controller to poll the at least one sensor immediately after polling each of the other sensors in the plurality of sensors.

In some embodiments, the command signal comprises a least one of an alarm signal and an equipment control signal.

In some embodiments, each sensor further comprises an individual power source.

In some embodiments, each sensor further comprises a solar cell operable to charge the power source.

In some embodiments, each sensor enters a reduced-power sleep mode when communication between the sensor and the base station is interrupted for a pre-determined length of time.

In another aspect, some embodiment provide a method of monitoring the magnitude of an electric field, the method comprising: a) serially polling a plurality of sensors in a first order to obtain a corresponding plurality of sensed electric field magnitudes; b) comparing the sensed magnitudes to a predetermined poll re-order threshold magnitude value; and c) serially polling the plurality of sensors in a different, second order when at least one sensors outputs a sensed electric field magnitude that exceeds the poll re-order threshold magnitude value.

In some embodiments, step c) further comprises the polling the at least one sensor more frequently than the other sensors.

In some embodiments, step c) further comprises polling the at least one sensor immediately after polling each of the other sensors in the plurality of sensors.

In some embodiments, the method further comprises generating and an alarm output when the at least one sensor senses an electric field magnitude that exceeds an alarm threshold magnitude value.

In some embodiments, the method further comprises inhibiting the movement of a piece of equipment toward the sensed electric field based on the alarm output.

In some embodiments, the method further comprises remotely adjusting a sensor resolution of one sensor by wirelessly transmitting a sensor control signal to the one sensor.

In some embodiments, the method further comprises polling each of the plurality of sensors at least once in a predetermined sampling period.

In some embodiments, the predetermined sampling period is less than 100 milliseconds.

These and other aspects of the invention are further identified and described in the following description of several example embodiments.

BRIEF DESCRIPTION OF THE DRAWINGS

A preferred embodiment of the present invention will now be described in detail with reference to the drawings, in which.

DETAILED DESCRIPTION

Cranes and other equipment with moving parts, including, for example, bucket trucks, are frequently used in close proximity to live, or energized, electrical lines. As the boom or other components of a crane are moved, there can be a risk that a part of the crane may come into contact with an electrical line, potentially electrocuting the operator and others, and damaging the equipment. Providing an electric field monitoring system on the crane may help reduce the likelihood of the crane contacting an energized electrical line. An electric field monitoring system can be used detect the presence and strength of an electric field near a crane boom (or another component of a crane) and, optionally can provide an alarm or command signal in response to detection of an electric field.

Figure 1:
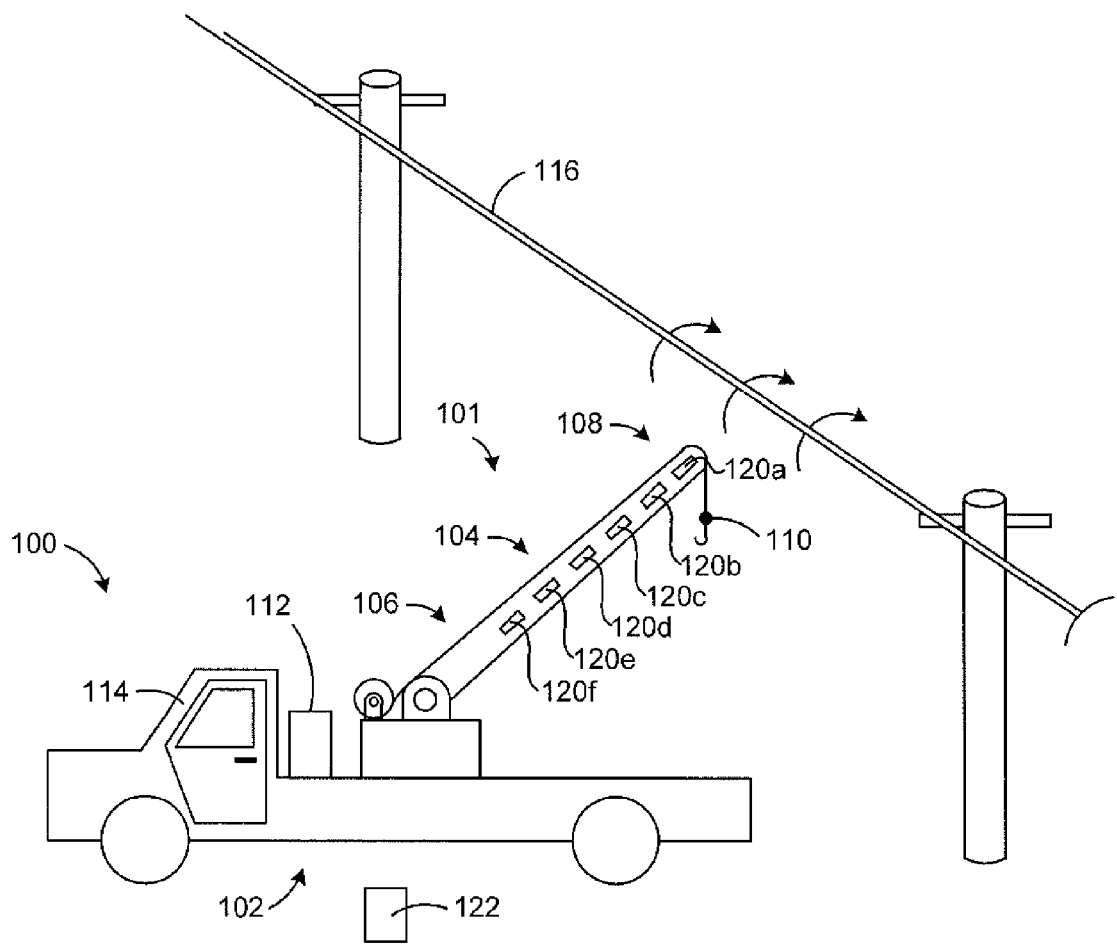
FIG. 1 is a schematic view of a crane equipped with an electrical line proximity monitoring system.
Figure 2:
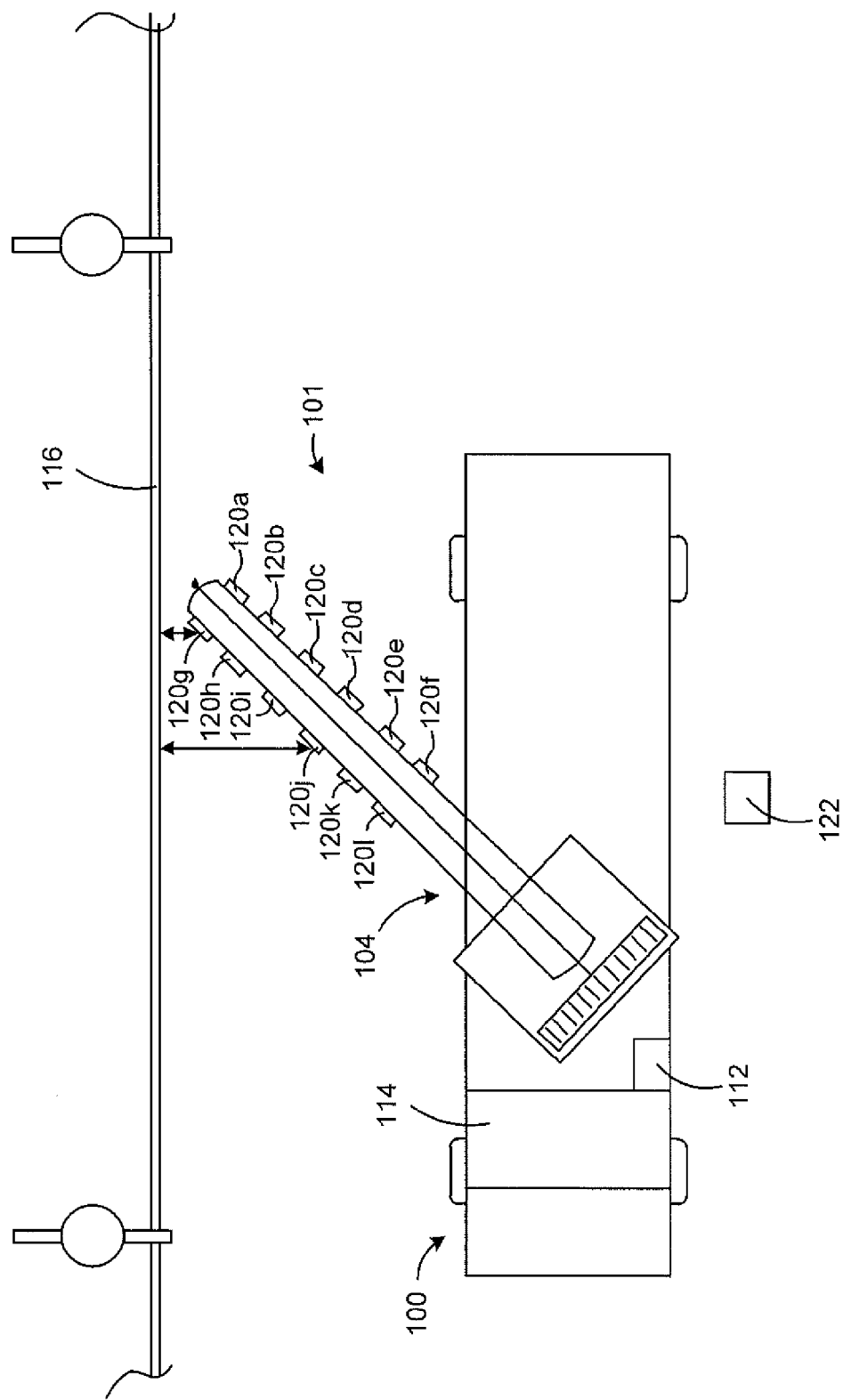
FIG. 2 is a top view of the crane of FIG. 1.

Referring to FIGS. 1 and 2, a schematic representation of a truck-mounted crane 100 includes a base 102, and a boom 104 with a lower boom section 106 and an upper boom section 108. A metal rope and hook 110 hang from the distal end of the upper boom section 108 and may be used to lift and lower items coupled to the hook. The crane 100 is controlled from a control unit 112, which allows the boom 106 to be rotated relative to the base 102, and raised and lowered.

Optionally, the upper boom section 108 may be telescopically extendible to adjust the lifting radius of the crane 100. In the illustrated example, the control unit 112 is mounted on the base of the crane. Alternatively, instead of being mounted on the base of the crane 100 the control unit 112 can be mounted within the cab 114 or can be removable from the crane 100. Providing a removable control unit 112 may allow an operator operate the crane 100 while standing a predetermined distance away from the base 102. Optionally, the removable control unit 112 can be linked to the crane 100 using a wire, or a wireless communication link.

In FIG. 1, the boom 104 of the crane 100 is illustrated in close proximity to a live electrical line 116. When the electrical line 116 is energized, an electric field exists in the vicinity of the electrical line 116. Generally, the magnitude of the electric field surrounding the electrical line 116 declines in accordance with Coulomb's Law, such that an object further from the electrical line 116 experiences an electric field of a smaller magnitude compared to an object positioned closer to the electrical line 116. Due to these variations in electric field magnitude, it may be safe for the boom 104 to be positioned a first distance away from the electrical line 116, and dangerous for the boom 104 to be positioned a second, closer, distance from the electrical line 116. In most instances, it is undesirable to position the boom 104 in direct, physical contact with the electrical line 116. Monitoring the magnitude of the electric field experienced by the boom 104, and the relative changes in electric field magnitude when the boom 104 is moved, can be used as a means to estimate the physical distance between the boom 104 and the electrical line 116.

In the illustrated example, an electric field monitoring system 101 for use with the crane 100 includes a plurality of electric field sensors 120a-l and a monitoring system base unit 122. Electric field sensors 120a-l are installed along the length of the boom 104. Sensors 120a-f are installed along one side of the boom 104, and sensors 120g-l are installed in corresponding positions on the opposite side of the booms 104.

Alternatively, or in addition to the sensors 120a-l mounted on the boom 102, sensors 120 can be mounted in other positions on the crane 100, including, for example, on the hook 110 and on the cab 114.

Each of the sensors 120a-l is coupled to a monitoring system base unit 122 to allowing the sensors to communicate with the monitoring system base unit 122. Optionally, the base unit 122 can be a self-contained unit that can be positioned in proximity to the operator of the crane 100. Alternatively, the base unit 122 can be integrated into the control unit 112, or other portion of the crane 100. In the illustrated example, the base unit 122 can be coupled to and communicate with each of the sensors 120a-l through a bidirectional wireless communication link, which may be based on a standard communication protocol or may be proprietary to the system. Alternatively, the sensors 120a-l may communicate with the base unit 122 using a wired connection.

Figure 3:
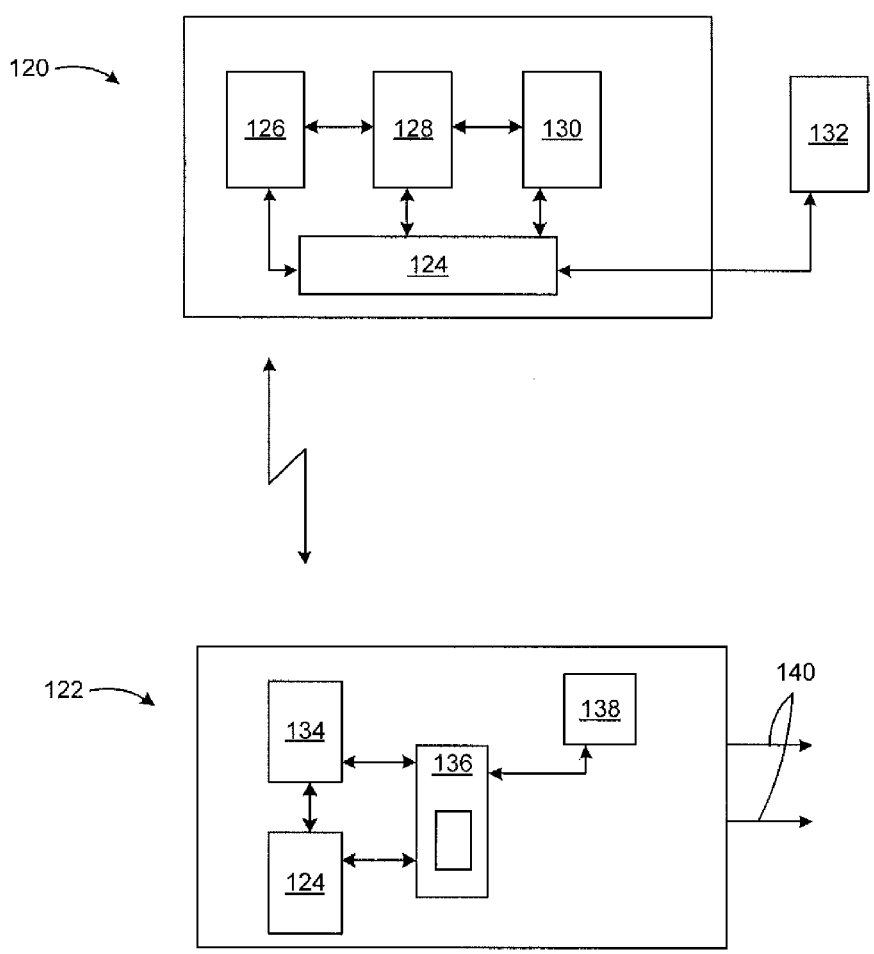
FIG. 3 is a block diagram of an example of a sensor and a base unit for use in an electrical line proximity monitoring system.

Reference is next made to FIG. 3, which comprises a block diagram of an example of a sensor 120 and an example of the base unit 122 that can be used in an electrical line proximity monitoring system. In the illustrated example, the sensor 120 includes a power source 124, a wireless transceiver 126, a controller 128 and an electric field magnitude detector 130. The power source 124 can be a battery or other suitable, generally self-contained power source. Optionally, a solar panel 132 can be connected to the power source 124. The solar panel 132 may help re-charge the power source 124, which may help prolong the service life of the sensor 120. Alternatively, or in addition to the solar panel 132, the power source 124 can be configured to be recharged using another source of power, including, for example, power generated by the motor of the crane 100, a portable generator or by plugging the sensor 120 into a standard wall socket when the crane 100 is not in use. Alternatively, instead of being rechargeable, the power source 124 can be a replaceable power source, such as conventional alkaline batteries. Optionally, the sensors 120a-l can be configured to enter a low-power, sleep mode after a predetermined period of inactivity, for example in the absence of polling requests from base unit 122 for a period of five minutes. In sleep mode, the electric field magnitude detector 130 can be disabled and other sensor 120a-l components can be configured to reduce their power consumption. Converting the sensors 120a-l to sleep mode may help reduce power consumption when the crane 100 is not in use, and may help prolong the life of the power source 124. Preferably, the sensors 120a-l can be remotely awakened from sleep mode by a wake-up signal transmitted by the base unit 122.

The electric field magnitude detector 130 may be any device that provides an analog or digital magnitude output signal corresponding to the magnitude of an electric field in which the sensor 120 is positioned.

The controller 128 is coupled to the electric field magnitude detector 130 to receive the magnitude output signal, which the controller 128 may optionally record. The controller 128 is also coupled to the wireless transceiver 126 to facilitate wireless communication with the base station 122.

The base station 122 includes a wireless transceiver 134, a controller 136 and a power source 144. Optionally, the power source 144 can be the same type of power source 124 used in the sensors 120a-l. Alternatively, the power source 124 in the base unit 122 can be different than the power sources 124 in the sensors 120a-l. For example, the base unit power source 144 may be the battery of a vehicle, such as the truck on which crane 100 is mounted, a municipal power source, a generator or any other source of electric power. The base unit 122 can also include an alarm transducer 138 for generating an alarm signal. The alarm transducer can be siren, light source, speaker or other type of transducer that can provide alarm information to the crane operator.

Optionally, the base unit 122 can also include one or more auxiliary outputs 140. The auxiliary outputs 140 can be used to control external pieces of equipment, including, for example the control unit 112 and the boom 104.

When the crane 100 is in use, the boom 104 can be moved relative to the electrical line 116. Moving the boom 104 causes a corresponding movement of the sensor 120a-l mounted on the boom 104. When the distance between the electrical line 116 and a sensor, for example sensor 120a changes, the magnitude of the electrical field detected by sensor 120a will change. For example, if sensor 120a is moved closer to the electrical line 116, the magnitude of the electrical field detected by the electric field magnitude detector 130 will generally increase.

The controller 128 in each sensor 120a-l can be configured to trigger the electric field magnitude detector 130 to sense the electric field magnitude at a pre-determined frequency or sampling rate. For example, each sensor 120a-l may be configured to sense the magnitude of the electric field surrounding the sensor 120a-l at a sample rate between about once per second and about once per 10 milliseconds, or at a rate of about once every 40 milliseconds. In other embodiments, the sensors may sense the magnitude of the electric field at a higher or lower frequency.

When triggered by its controller 128a-l, each sensor 120a-l senses the magnitude of the electric field immediately surrounding the sensor 120a-l. For a given boom position, the magnitude of the electric field detected by sensor 120a can be different than the magnitude detected by sensor 120l. The magnitude output signals generated each time the electric field magnitude detectors 130a-l sense the electric field magnitude can optionally be stored, permanently or temporarily, by the corresponding controllers 128a-l.

Periodically, the base unit 122 can poll each sensor 120a-l. In response to each poll request, the controllers 128a-l in the sensors 120a-l activate the wireless transceivers 126a-l to transmit the last recorded electric field magnitude to the base unit 122. In the illustrated example, the base unit 122 is configured to serially poll the sensors 120a-l in a given order and at a given polling rate. For example, the base unit 122 can poll the sensors 120a-l in the following order:

A B C D E F G H I J K L A B C D . . .

The base unit 122 can be configured to poll the sensors at a plurality of different polling rates, including, for example a polling rate between about once per second and about once per 10 milliseconds, or at a polling rate of about once every 40 milliseconds. In this example, each sensor 120a-l is polled by the base unit 122 at least one every 40 milliseconds. In other embodiments, the polling frequency may be higher or lower.

The base unit 122 compares each reported electric field magnitude to one or more predetermined electric field magnitude threshold values. In the illustrated example, the base controller 136 includes an analysis module 142 that stores the plurality of electric field magnitude threshold values, and can compare the sensed electric field magnitudes to the threshold values. If the electric field magnitude reported at any sensor 120a-l exceeds one or more of the electric field magnitude threshold values, the base unit 122 controller can be configured to perform a corresponding action.

In the illustrated example, the electric field magnitude threshold values can include a re-poll or low alert threshold valve. If the electric field magnitude of a given sensor, for example sensor 120g, exceeds the low alert threshold value it may mean that sensor 120g is in relatively close proximity to the electrical line 116. To help monitor the position of sensor 120g more closely, it may be desirable to poll sensor 120g more frequently than the other sensors 120 that did not report an electric field magnitude above the low alert threshold. For example, in one embodiment, the base unit 122 can poll sensor 120g more frequently than the other sensors 120, and optionally may poll sensor 120g on every second poll. The remaining sensors 120 are then polled sequentially in the remaining poll slots. In this example, the polling order would be:

A G B G D G E G F G H G I G J G K G L G A G B G . . .

This increased polling can optionally continue until sensor 120g reports an electric field magnitude below the low alert limit threshold.

Optionally, in some embodiments, the polling frequency for more than one sensor 120 may be increased, for example if more than one sensor 120 detects an electric field magnitude above the low alert threshold.

Alternatively, or in addition to using an absolute low alert threshold value, the monitoring system may use a relative re-poll threshold value, such as, for example, the highest electric field magnitude sensed by any of the sensors 120. In this example, the polling frequency for the sensor 120a-l reporting the highest electric field magnitude may be increased in the manner described above, even if the sensed electric field magnitude is not greater than an absolute low alert threshold value.

The monitoring system can also include a medium alert or alarm threshold value. When a sensor 120a-l transmits an electric field magnitude value that exceeds the alarm threshold to the base unit 122, the controller 136 can be configured to output an alarm signal, and trigger the alarm transducer 138. Triggering the alarm transducer 138, for example sounding an alert siren, may help notify the crane operator that the boom 104 is too close to the electrical line 116. In some instances, in response to hearing the alert siren, the crane operator may stop moving the boom 104, or move it away from the electrical line 116. Optionally, the alarm transducer 138 can also include a flashing light and other mechanisms for attracting the attention of the crane operator.

Optionally, the monitoring system can also include a high alert threshold value. When a sensed electric field magnitude exceeds the high alert threshold value the controller 136 can be configured to automatically disable further movement of the crane's boom 104 (or other moving portion of the machine). To disable the movement of the machine, equipment shutdown signals can be output via the auxiliary outputs 140 and can be used to disable systems driving the moving portion of the machine, including for example, the boom actuators and crane motor. Optionally, the auxiliary outputs 140 can be connected to the control unit 112. Automatically disabling the movement of the crane's boom 104 may help prevent the boom 104 from contacting the electrical line 116.

Optionally, the monitoring system may be configured to only disable further movement of the crane's boom 104 in a direction that might increase the electric field near the sensor 120a-l that has exceeded the high alert threshold, while still allowing the boom 104 to be moved away from the electrical line 116.

In the illustrated example, the threshold and alarm limits may be set by the crane operator, and may be adjusted based on the characteristics of the electrical line 116, sensors 120a-l and other variables.

Optionally, the wireless communication link between the sensors 120a-l and the base unit 122 is bidirectional to allow the based unit 122 to send poll requests to the sensors 120a-l. In some embodiments, the base unit 122 may also transmit other control signals to the sensors 120a-l, such as instructions to increase or decrease the resolution of electric field strength measurement. The ability to remotely adjust the resolution of the sensors 120a-l may allow a crane operator to adjust the resolution of the sensors 120a-l based on the characteristics of a given electrical line.

In the embodiment described above, the base unit 122 polls each sensor 120a-l to obtain the sensed electric field magnitudes. Alternatively, in other embodiments, the different sensors 120a-l may transmit their recorded electric field magnitude measurements, together with an identifier for the sensor, to the base unit 122 using a time division multiplexing protocol. In this example, each sensor 120a-l, can be assigned a time slice or time slot relative to a master clock or sync signal. The base unit may 122 transmit a sync signal at the start of a time period (for example when the crane is in use). Each sensor can then wait until its assigned time slot to transmit its identifier and recorded electric field magnitude.

Alternatively, or in addition to any of configurations described above, the sensors 120a-l may transmit their recorded electric field measurements at different frequencies, allowing the base unit 122 to wirelessly communicate with multiple sensors 120a-l at once.

Figure 4:
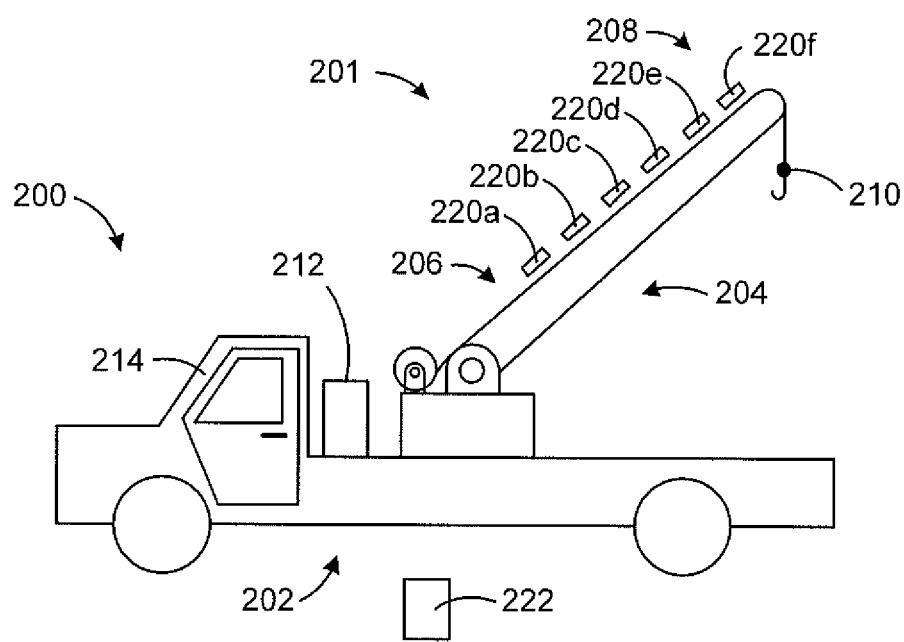
FIG. 4 is a schematic view of a crane equipped with another electrical line proximity monitoring system.
Figure 5:
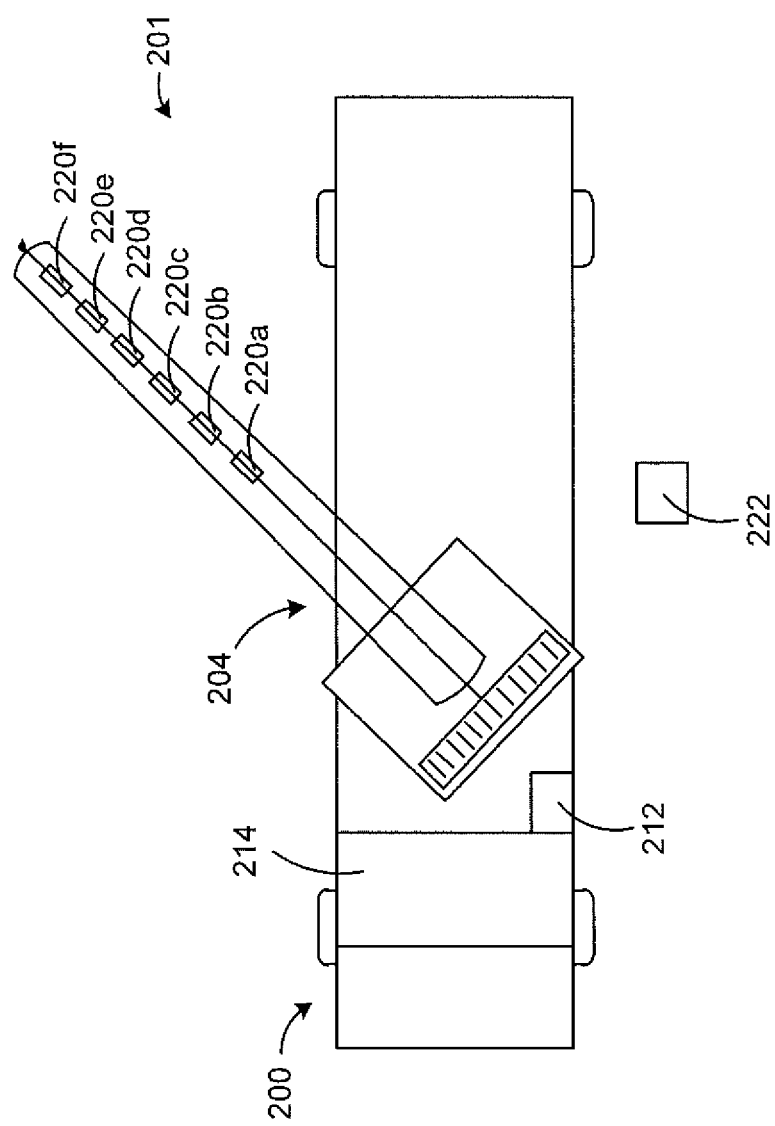
FIG. 5 is a top view of the crane of FIG. 4.

Reference is next made to FIGS. 4 and 5 which illustrate another electric field monitoring system 201 mounted on a crane 200. Electric field monitoring system 201 is similar to the electric field monitoring system 101 and corresponding elements are identified by similar reference numerals.

In electric field monitoring system 201, the electric field sensors 120a-f are mounted on a top side of the crane boom 204. In this configuration, the electric field sensors 120a-f can sense an electric field on either side of the boom 204, potentially reducing the number of electric field sensors required for a boom of a given length. System 201 is otherwise essentially the same as system 101.

Optionally, the electric field monitoring systems described above may be used in other environments where a device is moved in relation to the position of an electrical line or other potentially dangerous electric field. For example, this invention may be used with a basket truck, excavation equipment, a dump truck or a building crane.

The present invention has been described here by way of example only. Various modification and variations may be made to these exemplary embodiments without departing from the spirit and scope of the invention, which is limited only by the appended claims.

We claim:

1. An electric field monitoring system comprising:
a plurality of sensors mountable on a piece of equipment, each sensor comprising a sensing apparatus, a sensor controller and a wireless sensor transceiver, wherein the sensing apparatus is operable to sense a magnitude of an electric field, the controller is linked to the sensing apparatus and is operable to generate a sensor magnitude output signal corresponding to the sensed magnitude, and the sensor transceiver is linked to the sensor controller and is operable to transmit the sensor magnitude output signal;
a base station comprising a base controller and a wireless base transceiver, wherein the base transceiver is configured to wirelessly communicate with each of the plurality of sensor transceivers, and the base controller is linked to the base transceiver to receive the plurality of sensor magnitude output signals; and
an analysis module to compare the plurality of sensor magnitude output signals to a pre-determined threshold magnitude and to output a command signal when the magnitude of at least one sensor magnitude output signal exceeds the threshold magnitude.

2. The system of claim 1, wherein each sensor transceiver is in two-way communication with the base transceiver.

3. The system of claim 2, wherein the base transceiver is operable to wirelessly transmit a sensor control signal to each sensor to remotely control an operational parameter of each sensor.

4. The system of claim 3, wherein the sensor control signal comprises an instruction to adjust an electric field sensing resolution of the sensing apparatus.

5. The system of claim 1, wherein the base controller is operable to selectably trigger the base transceiver to poll the plurality of sensors to obtain the sensor magnitude output signals.

6. The system of claim 5, wherein the base controller is operable to serially poll the plurality of sensors in a first order.

7. The system of claim 6, wherein when at least one sensor outputs a sensor magnitude output signal that exceeds the threshold magnitude, the command signal comprises a poll re-order signal that configures the base controller to re-order a sequence of polling the plurality of sensors for sensor magnitude output signals.

8. The system of claim 7, wherein the poll re-order signal configures the base controller to poll the at least one sensor more frequently than the other sensors in the plurality of sensors.

9. The system of claim 8, wherein the poll re-order signal configures the base controller to poll the at least one sensor immediately after polling each of the other sensors in the plurality of sensors.

10. The system of claim 1, wherein the command signal comprises a least one of an alarm signal and an equipment control signal.

11. The system of claim 1, wherein each sensor further comprises an individual power source.

12. The system of claim 11, wherein each sensor further comprises a solar cell operable to charge the power source.

13. The system of claim 11, wherein each sensor enters a reduced-power sleep mode when communication between the sensor and the base station is interrupted for a pre-determined length of time.

14. A method of monitoring the magnitude of an electric field, the method comprising:
   a) polling each of a plurality of sensors in a first sequential order to obtain a corresponding plurality of sensed electric field magnitudes;
   b) comparing the sensed magnitudes to a predetermined poll re-order threshold magnitude value; and
   c) polling each of the plurality of sensors in a second sequential order different from the first sequential order when at least one of the plurality of sensors outputs a sensed electric field magnitude that exceeds the poll re-order threshold magnitude value.

15. The method of claim 14, wherein step c) further comprises polling the at least one sensor more frequently than the other sensors.

16. The method of claim 15, wherein step c) further comprises polling the at least one sensor immediately after polling each of the other sensors in the plurality of sensors.

17. The method of claim 14, further comprising generating an alarm output when the at least one sensor senses an electric field magnitude that exceeds an alarm threshold magnitude value.

18. The method of claim 17, further comprising inhibiting the movement of a piece of equipment toward the sensed electric field based on the alarm output.

19. The method of claim 14, further comprising wirelessly transmitting a sensor control signal to the one sensor, the sensor control signal instructing the one sensor to adjust a sensor resolution of the one sensor.

20. The method of claim 14, further comprising polling each of the plurality of sensors at least once in a predetermined sampling period.

21. The method of claim 20, wherein the predetermined sampling period is less than 100 milliseconds.

* * * * *

UNITED STATES PATENT AND TRADEMARK OFFICE
CERTIFICATE OF CORRECTION

| | | |
|---|---|---|
| PATENT NO. | : 8,866,469 B2 | Page 1 of 1 |
| APPLICATION NO. | : 13/417607 | |
| DATED | : October 21, 2014 | |
| INVENTOR(S) | : Robert Parr et al. | |

It is certified that error appears in the above-identified patent and that said Letters Patent is hereby corrected as shown below:

On the Title Page, item (73) Assignee "Altas Polar Company Limited" should read --Atlas Polar Company Limited--

Signed and Sealed this
Tenth Day of February, 2015

Michelle K. Lee
*Deputy Director of the United States Patent and Trademark Office*